United States Patent
Kamiya

(10) Patent No.: US 8,198,342 B2
(45) Date of Patent: Jun. 12, 2012

(54) ALUMINUM CHELATE LATENT CURING AGENT AND PRODUCTION METHOD THEREOF

(75) Inventor: Kazunobu Kamiya, Tochigi (JP)

(73) Assignee: Sony Chemical and Information Device Corporation, Tokyo (JP)

( * ) Notice: Subject to any disclaimer, the term of this patent is extended or adjusted under 35 U.S.C. 154(b) by 179 days.

(21) Appl. No.: 12/866,597

(22) PCT Filed: Jan. 13, 2010

(86) PCT No.: PCT/JP2010/050250
§ 371 (c)(1),
(2), (4) Date: Aug. 6, 2010

(87) PCT Pub. No.: WO2010/084804
PCT Pub. Date: Jul. 29, 2010

(65) Prior Publication Data
US 2010/0331435 A1 Dec. 30, 2010

(30) Foreign Application Priority Data
Jan. 21, 2009 (JP) ................. 2009-011337

(51) Int. Cl.
*C08K 5/1525* (2006.01)
*C08K 5/5419* (2006.01)
*C08L 63/02* (2006.01)

(52) U.S. Cl. ........ 521/110; 521/123; 521/124; 521/161; 521/187; 523/453; 523/466; 524/114; 524/188; 528/87

(58) Field of Classification Search .................. 524/114, 524/188
See application file for complete search history.

(56) References Cited

U.S. PATENT DOCUMENTS

| 6,921,782 B2 | 7/2005 | Matsushima |
| 2007/0010636 A1 | 1/2007 | Kamiya et al. |
| 2008/0319110 A1 | 12/2008 | Kamiya et al. |
| 2009/0230360 A1 | 9/2009 | Komuro et al. |
| 2009/0275708 A1 | 11/2009 | Kamiya |

FOREIGN PATENT DOCUMENTS

| EP | 1837358 | * | 9/2007 |
| JP | A-2002-212537 | | 7/2002 |
| JP | A-2006-70051 | | 3/2006 |
| JP | A-2009-221465 | | 10/2009 |
| WO | WO 2007/007725 A1 | | 1/2007 |
| WO | WO 2008/090792 A1 | | 7/2008 |
| WO | WO 2009/019906 A1 | | 2/2009 |
| WO | WO 2009/093364 A1 | | 7/2009 |

OTHER PUBLICATIONS

International Search Report in International Application No. PCT/JP2010/050250, dated Mar. 9, 2010 (with English translation).

* cited by examiner

*Primary Examiner* — Irina S Zemel
(74) *Attorney, Agent, or Firm* — Oliff & Berridge, PLC

(57) ABSTRACT

An aluminum chelate latent curing agent includes an aluminum chelate curing agent, and a porous resin that holds the aluminum chelate curing agent and is obtained by subjecting a polyfunctional isocyanate compound to interfacial polymerization while simultaneously subjecting a polyfunctional radical polymerizable compound to radical polymerization in the presence of a radical polymerization initiator. In the aluminum chelate latent curing agent, a silanol compound of the formula (A) is further held in the porous resin.

$$(Ar)_m Si(OH)_n \quad (A)$$

In the formula, m is 2 or 3, and the sum of m and n is 4. Ar represents an optionally-substituted aryl group.

8 Claims, 6 Drawing Sheets

ALUMINUM CHELATE LATENT CURING AGENT AND PRODUCTION METHOD THEREOF

TECHNICAL FIELD

The present invention relates to an aluminum chelate latent curing agent in which an aluminum chelate curing agent is held in a porous resin.

BACKGROUND ART

As a curing agent exhibiting low-temperature fast curing activity for an epoxy resin, a micro-encapsulated aluminum chelate latent curing agent has previously been proposed in which an aluminum chelate curing agent is held in a porous resin obtained by subjecting a polyfunctional isocyanate compound to interfacial polymerization (Patent Document 1). Furthermore, a thermosetting epoxy resin composition in which a silane coupling agent, which has a polymerizable group such as a vinyl group and a trialkoxy group, and an epoxy resin are blended in an aluminum chelate latent curing agent, has excellent storage stability, despite it being a one-component type. In addition, such a thermosetting epoxy resin composition has the property of low-temperature fast curing by cationic polymerization (Patent Document 1).

PRIOR ART DOCUMENTS

Patent Documents

[Patent Document 1] Japanese Patent Application Laid-Open No. 2006-70051

SUMMARY OF THE INVENTION

Problems to be Solved by the Invention

However, for the thermosetting epoxy resin composition described in Patent Document 1, in which a silane coupling agent and an epoxy resin are blended with an aluminum chelate latent curing agent, if a polymerization (curing) reaction is started by heating, silanolate anions are produced from the silane coupling agent. These silanolate anions are added to the β carbon of the epoxy group of the epoxy resin, which can cause a polymerization termination reaction to occur. Therefore, for the aluminum chelate latent curing agent described in Patent Document 1, it is difficult to polymerize a glycidyl ether epoxy resin, which tends to undergo a β carbon addition reaction, without causing a polymerization termination reaction to occur. Consequently, even though alicyclic epoxy compounds have a high production cost, it has been necessary to use an alicyclic epoxy compound because the addition reaction of a silanolate anion onto the β carbon does not occur easily.

Furthermore, when producing a thermosetting epoxy resin composition from an aluminum chelate latent curing agent, a silane coupling agent, and an epoxy resin, a step of dissolving or dispersing the silane coupling agent in the epoxy resin in advance is necessary. To reduce production costs, this step of dissolving or dispersing needs to be omitted. Moreover, since the silane coupling agent (or a silanol compound that can be used instead) is directly mixed into the thermosetting epoxy resin composition, the use of epoxy resins having a functional group which causes an unintentional reaction is restricted.

The present invention is directed to resolving the above-described problems in the conventional art. It is an object of the present invention to enable low-temperature fast curing of a glycidyl ether epoxy resin with an aluminum chelate latent curing agent without using an alicyclic epoxy compound. Furthermore, it is an object of the present invention to allow the step of dissolving or dispersing a silane coupling agent in an epoxy resin in advance to be omitted when producing a thermosetting epoxy resin composition. In addition, it is an object of the present invention to enable the use of an epoxy resin or the like having a functional group which inherently reacts with a silane coupling agent (or a silanol compound).

Means for Solving the Problems

The present inventor researched the use of silanol compounds having a specific chemical structure with high steric hindrance to promote cationic catalyst formation for an aluminum chelate latent curing agent. As a result, the present inventor discovered that the above objectives could be achieved due to the following surprising facts: the reactivity of the silanol compounds having the specific chemical structure with high steric hindrance with the isocyanate group is low during interfacial polymerization of a polyfunctional isocyanate compound; the above-described silanol compound having the above-described specific chemical structure with high steric hindrance is held in a porous resin which acts as a microcapsule wall obtained by also having a polyfunctional radical polymerizable compound present, and simultaneously carrying out radical polymerization during the interfacial polymerization; and the specific silanol compound held in this porous resin surprisingly suppresses a polymerization termination reaction, and forms a cationic active species with the aluminum chelate curing agent. Based on these discoveries, the present inventor completed the present invention.

More specifically, the present invention provides an aluminum chelate latent curing agent, including an aluminum chelate curing agent, and a porous resin that holds the aluminum chelate curing agent and is obtained by subjecting a polyfunctional isocyanate compound to interfacial polymerization while simultaneously subjecting a polyfunctional radical polymerizable compound to radical polymerization in the presence of a radical polymerization initiator, wherein a silanol compound of the formula (A) is further held in the porous resin.

$$(\text{Ar})_m\text{Si(OH)}_n \tag{A}$$

In the formula, m is 2 or 3, and the sum of m and n is 4. Ar represents an optionally-substituted aryl group.

Furthermore, the present invention provides a method for producing the above-described aluminum chelate latent curing agent, including charging an oil phase obtained by dissolving or dispersing an aluminum chelate curing agent, a polyfunctional isocyanate compound, a polyfunctional radical polymerizable compound, a radical polymerization initiator, and a silanol compound of the formula (A) in an organic solvent into an aqueous phase including a dispersant while heating and stirring to cause the polyfunctional isocyanate compound to undergo interfacial polymerization while the polyfunctional radical polymerizable compound simultaneously undergoes radical polymerization, so that the aluminum chelate curing agent and the silanol compound of the formula (A) are held in the resultant porous resin.

In addition, the present invention provides a thermosetting epoxy resin composition including the above-described aluminum chelate latent curing agent and an epoxy resin.

Effects of the Invention

In the aluminum chelate latent curing agent according to the present invention, a silanol compound having a specific chemical structure with high steric hindrance is held in (in other words, is protected by) a porous resin obtained by subjecting a mixture of a polyfunctional isocyanate compound and a polyfunctional radical polymerizable compound to interfacial polymerization and radical polymerization, respectively. Consequently, in addition to suppressing a polymerization termination reaction, an aluminum chelate curing agent and a cationic active species can be formed. Further, even an epoxy resin having a functional group which may react with the silanol compound can be used. Therefore, in a thermosetting epoxy resin composition including the aluminum chelate latent curing agent according to the present invention, a glycidyl ether epoxy resin as an epoxy resin can be subjected to low-temperature fast curing, despite the fact that a silanol compound is also used. Moreover, since a specific silanol compound is held in a porous resin acting as a capsule wall, during the production of a thermosetting epoxy resin composition, a step for dissolving or dispersing the silanol compound in the epoxy resin in advance is unnecessary.

EMBODIMENTS FOR CARRYING OUT THE INVENTION

Figure 1:
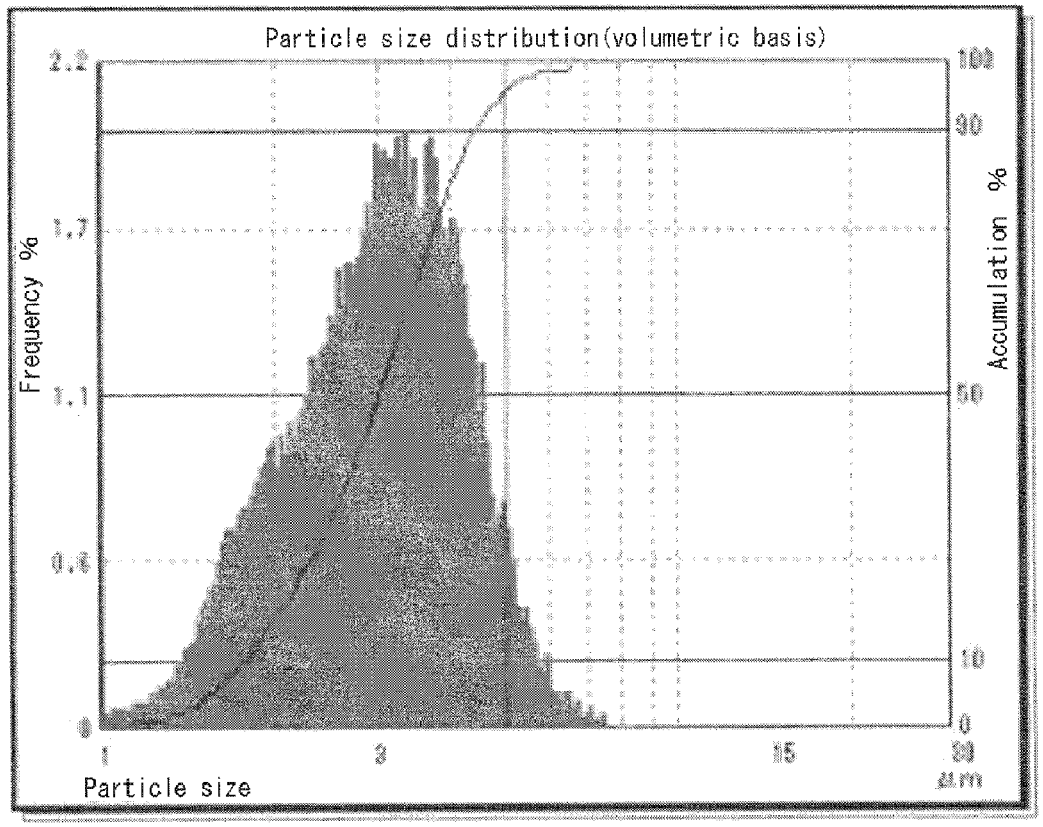
FIG. 1 is a grain size distribution map of the aluminum chelate latent curing agent of Example 1.

The aluminum chelate latent curing agent according to the present invention includes an aluminum chelate curing agent and a porous resin holding the aluminum chelate curing agent, the porous resin being obtained by subjecting a polyfunctional radical polymerizable compound to radical polymerization in the presence of a radical polymerization initiator while simultaneously subjecting a polyfunctional isocyanate compound to interfacial polymerization. Further, the aluminum chelate latent curing agent according to the present invention also includes a silanol compound having high steric hindrance held in the porous resin. More specifically, the aluminum chelate latent curing agent is not formed as a microcapsule having a simple structure in which a porous resin shell is coated around an aluminum chelate curing agent core. Rather, the aluminum chelate latent curing agent is formed as a structure in which an aluminum chelate curing agent is held in a plurality of fine pores present in a porous resin matrix.

The aluminum chelate latent curing agent according to the present invention has a spherical shape, because it is produced utilizing an interfacial polymerization method. From the perspectives of curing properties and dispersibility, the aluminum chelate latent curing agent preferably has a particle size of 0.5 to 100 μm. Further, from the perspectives of curing properties and latency, it is preferred that the pores have a size of 5 to 150 nm.

In addition, if the degree of crosslinking of the used porous resin is too small, the latency of the aluminum chelate latent curing agent tends to deteriorate, while if the degree of crosslinking is too large, the thermal responsiveness of the aluminum chelate latent curing agent tends to deteriorate. Therefore, it is preferred to use a porous resin having a degree of crosslinking adjusted based on the intended usage. Here, the degree of crosslinking of the porous resin can be measured by a micro-compression test.

From the perspective of curing stability, it is preferred that the aluminum chelate latent curing agent essentially does not include the organic solvent used during the interfacial polymerization thereof. Specifically, it is preferred that the aluminum chelate latent curing agent includes no greater than 1 ppm of the organic solvent.

Regarding the blend of the porous resin and the aluminum chelate curing agent in the aluminum chelate latent curing agent, if the blended amount of the aluminum chelate curing agent is too low, the curing properties of the epoxy resin to be cured deteriorate. Further, if the blended amount is too high, the latency of the aluminum chelate latent curing agent deteriorates. Therefore, the blended amount of aluminum chelate latent curing agent is preferably 10 to 200 parts by mass, and more preferably 10 to 150 parts by mass, with respect to 100 parts by mass of the porous resin.

If the blended amount of the silanol compound having high steric hindrance in the aluminum chelate latent curing agent according to the present invention is too low, curing is insufficient, while if the blended amount is too high, latency deteriorates. Therefore, the blended amount of the silanol compound is preferably 10 to 200 parts by mass, and more preferably 10 to 150 parts by mass, with respect to 100 parts by mass of the porous resin.

Unlike a conventional silane coupling agent which has a trialkoxy group, the silanol compound having high steric hindrance used in the present invention is an aryl silanol having a chemical structure represented by the following formula (A).

$$(Ar)_m Si(OH)_n \qquad (A)$$

In the formula, m is 2 or 3, and preferably is 3. However, the sum of m and n is 4. Therefore, the silanol compound of the formula (A) is a mono- or diol. "Ar" is an optionally-substituted aryl group. Examples of the aryl group include a phenyl group, a naphthyl group (for example, a 1- or 2-naphthyl group), an anthracenyl group (for example, a 1-, 2-, or 9-anthracenyl group, or a benz[a]-9-anthracenyl group), a phenaryl group (for example, a 3- or 9-phenaryl group), a pyrenyl group (for example, a 1-pyrenyl group), an azulenyl group, a fluorenyl group, a biphenyl group (for example, a 2-, 3-, or 4-biphenyl group), a thienyl group, a furyl group, a pyrrolyl group, an imidazolyl group, and a pyridyl group. Of these, from the perspectives of ease of acquisition and acquisition cost, a phenyl group is preferred. The m number of Ar(s) may be the same or different. However, from the perspective of ease of acquisition, it is preferred that the Ar(s) are the same.

These aryl groups can have 1 to 3 substituents. Examples of such substituents include: a halogen such as chloro and bromo; trifluoromethyl; nitro; sulfo; an alkoxy carbonyl such as carboxyl, methoxycarbonyl, and ethoxycarbonyl; an electron withdrawing group such as formyl; an alkyl such as methyl, ethyl, and propyl; an alkoxy such as methoxy and ethoxy; hydroxy; amino; a monoalkylamino such as monomethylamino; and an electron donating group such as a dialkylamino like dimethylamino. Using an electron withdrawing group as a substituent enables the acidity of the hydroxyl group of the silanol to be increased. Conversely, if an electron donating group is used, since acidity decreases, the curing activity can be controlled. Here, although the substituents may differ for each of the m number of Ar(s), from the perspective of ease of acquisition, it is preferred that substituents for the m number of Ar(s) are the same. Further, some of the Ar(s) may have a substituent, while the other Ar(s) do not. Specific examples of a phenyl group having a substituent include a 2-, 3- or 4-methyl phenyl group; a 2,6-dimethyl-, 3,5-dimethyl-, 2,4-dimethyl-, 2,3-dimethyl-, 2,5-dimethyl-, or 3,4-dimethyl phenyl group; a 2,4,6-trimethyl phenyl group; and a 2- or 4-ethyl phenyl group.

Among the silanol compounds of the formula (A), preferred examples include triphenylsilanol or diphenylsilanediol. Especially preferred is triphenylsilanol.

Examples of the aluminum chelate curing agent constituting the aluminum chelate latent curing agent according to the present invention include complex compounds in which three β-ketoenolate anions are coordinated to aluminum as shown in the following formula (1).

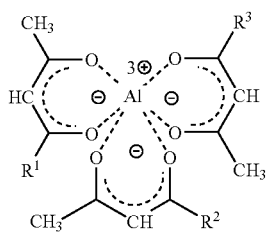
(1)

Here, $R^1$, $R^2$, and $R^3$ are each independently an alkyl or an alkoxyl group. Examples of the alkyl group include a methyl group and an ethyl group. Examples of the alkoxyl group include a methoxy group, an ethoxy group, and an oleyloxy group.

Specific examples of the aluminum chelate curing agent represented by the formula (1) include aluminum tris(acetylacetonate), aluminum tris(ethylacetoacetate), aluminum monoacetylacetonate bis(ethylacetoacetate), aluminum monoacetylacetonate bisoleylacetoacetate, ethylacetoacetate aluminum diisopropylate, and alkylacetoacetate aluminum diisopropylate.

The polyfunctional isocyanate compound for constituting the porous resin preferably contains two or more, and more preferably three, isocyanate groups in one molecule. Preferred examples of such trifunctional isocyanate compounds include a trimethylolpropane (TMP) adduct obtained by reacting 1 mole of TMP with 3 moles of a diisocyanate compound, as represented by the formula (2); an isocyanurate obtained by self-condensation of 3 moles of a diisocyanate compound, as represented by the formula (3); and a biuret obtained by condensation of diisocyanate urea obtained from 2 moles of 3 moles of a diisocyanate compound with the remaining 1 mole of the diisocyanate compound, as represented by formula (4).

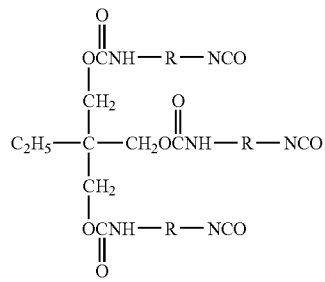
(2)

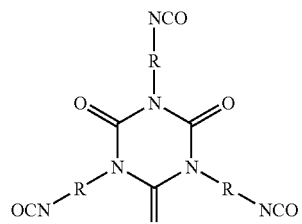
(3)

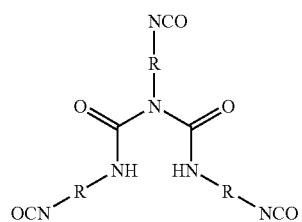
(4)

In the formulae (2) to (4), the substituent R is a moiety composed of a diisocyanate compound from which the isocyanate group was removed. Specific examples of such a diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylenediphenyl-4,4'-diisocyanate.

Furthermore, a polyfunctional radical polymerizable compound, which is another component for constituting the porous resin, simultaneously undergoes radical polymerization during the interfacial polymerization of the polyfunctional isocyanate compound, so that the mechanical properties of the porous resin constituting the microcapsule wall improve. Consequently, thermal responsiveness during the curing of the epoxy resin can be increased.

Such a polyfunctional radical polymerizable compound has two or more carbon-carbon unsaturated bonds in the molecule. Examples thereof include vinyl monomers represented by divinyl benzene, and acrylate monomers such as 1,6-hexanediol diacrylate and trimethylolpropane triacrylate. Of these, from the perspectives of latency and thermal responsiveness, it is preferred to use divinyl benzene.

The radical polymerization initiator initiates radical polymerization under interfacial polymerization conditions of the polyfunctional isocyanate compound. Examples which may be used include peroxide initiators and azo initiators.

The porous resin is obtained by subjecting the polyfunctional radical polymerizable compound to radical polymerization in the presence of a radical polymerization initiator while simultaneously subjecting the polyfunctional isocyanate compound to interfacial polymerization. In such a porous resin, during the interfacial polymerization, some of the isocyanate groups are hydrolyzed into amino groups. Thus, this porous resin has an aspect of being a porous polyurea which is obtained by the polymerization of a urea bond produced by the amino groups reacting with the isocyanate groups. Further, the porous resin also has an aspect of being a three-dimensional polymer, in which radicals produced by the decomposition of the radical polymerization initiator during the radical polymerization bond the unsaturated bonds in a chain like manner. Although the specific reason is unclear, when an aluminum chelate latent curing agent formed from a porous resin having such aspects, and an aluminum chelate curing agent and the silanol compound of the formula (A) held in the pores of the porous resin, is heated in order to cure the epoxy resin, the held aluminum chelate curing agent and the silanol compound of the formula (A) can come into contact with the epoxy resin, so that the curing reaction can be accelerated.

Based on the structure of the aluminum chelate latent curing agent, the aluminum chelate curing agent would be expected to be present also on the surface of the aluminum chelate latent curing agent. However, aluminum chelate curing agent on the surface of the aluminum chelate latent curing agent is inactivated by the water present in the polymerization reaction system during the interfacial polymerization. Thus, only the aluminum chelate curing agent held within the porous resin remains active. This active aluminum chelate curing agent within the porous resin is thought to be responsible for the latency of the obtained curing agent.

The aluminum chelate latent curing agent according to the present invention can be produced as follows. An oil phase is obtained by dissolving or dispersing the aluminum chelate curing agent, the polyfunctional isocyanate compound, the polyfunctional radical polymerizable compound, the radical polymerization initiator, and the silanol compound of the formula (A) in an organic solvent. This oil phase is charged into an aqueous phase including a dispersant while heating and stirring to cause the polyfunctional isocyanate compound to undergo interfacial polymerization while the polyfunctional radical polymerizable compound simultaneously undergoes radical polymerization. Consequently, the aluminum chelate curing agent and the silanol compound of the formula (A) are held in the resultant porous resin. This method will now be described in more detail.

In this production method, first, the aluminum chelate curing agent, the polyfunctional isocyanate compound, the polyfunctional radical polymerizable compound, the radical polymerization initiator, and the silanol compound of the formula (A) are dissolved or dispersed in an organic solvent, preferably in a volatile organic solvent, to form a solution to serve as the oil phase in the interfacial polymerization. The reason for preferably using a volatile organic solvent is as follows. Other organic solvents with high boiling points of more than 300° C. that are normally used in interfacial polymerization methods do not evaporate during the interfacial polymerization. Consequently, the probability of an isocyanate coming into contact with water does not increase, so that the interfacial polymerization between isocyanate and water does not proceed to a sufficient degree. This makes it difficult to obtain a polymer product with good shape retention properties even by interfacial polymerization. Furthermore, even if such a polymer product is obtained, the high-boiling-point solvent remains in the polymer product. When blended into a thermosetting epoxy resin composition, the high-boiling point solvent has an adverse impact on the physical properties of the cured product of the thermosetting epoxy resin composition. For this reason, it is preferred to use a volatile solvent as the organic solvent in the preparation of the oil phase.

Preferably, the volatile organic solvent can effectively dissolve the aluminum chelate curing agent, the polyfunctional isocyanate compound, the polyfunctional radical polymerizable compound, the radical polymerization initiator, and the silanol compound of the formula (A) (i.e., respective solubility of preferably 0.1 g/ml (organic solvent) or higher), is substantially incompatible with water (i.e., solubility in water of 0.5 g/ml (organic solvent) or less), and has a boiling point of 100° C. or less at atmospheric pressure. Specific examples of such volatile organic solvents include alcohols, acetates, and ketones. Of these, acetates, and especially ethyl acetate, are preferred because of their high polarity, low boiling point, and poor solubility in water.

If the used amount of the volatile organic solvent is too low, the particle size and the curing properties become more varied, while if the used amount is too high, the curing properties deteriorate. Therefore, the used amount of the volatile organic solvent is preferably 10 to 500 parts by mass with respect to 100 parts by mass of the aluminum chelate curing agent, the polyfunctional isocyanate compound, the polyfunctional radical polymerizable compound, the radical polymerization initiator, and the silanol compound of the formula (A).

If the used amount of the volatile organic solvent is within this range, the viscosity of the solvent serving as the oil phase can be reduced by using a comparatively large amount of volatile organic solvent. Further, since stirring efficiency improves if the viscosity is reduced, the oil phase droplets in the reaction system can become finer and more uniform. Consequently, while controlling the particle size of the obtained latent curing agent to about submicron to several tens of microns, a monodisperse particle size distribution can be obtained. It is preferred to set the viscosity of the solvent serving as the oil phase to 1 to 100 mPa·s.

If PVA is used when emulsifying and dispersing the polyfunctional isocyanate compound and the like in the aqueous phase, the polyfunctional isocyanate compound reacts with the hydroxyl group of the PVA. This results in the produced byproducts adhering to the periphery of the latent curing agent particles as foreign material. Further, this also causes the shape of the particles to deform. Examples of measures to prevent this phenomenon include promoting the reactivity between the polyfunctional isocyanate compound and water, or to suppress the reactivity between the polyfunctional isocyanate compound and the PVA.

To promote the reactivity between the polyfunctional isocyanate compound and water, the blended amount of the aluminum chelate curing agent is preferably set to ½ or less, and more preferably ⅓ or less, the weight of the polyfunctional isocyanate compound. Consequently, the probability of the polyfunctional isocyanate compound and the water coming into contact increases, which makes it easier for the polyfunctional isocyanate compound and the water to react before the PVA comes into contact with the surface of the oil phase droplets.

One example of a method to suppress the reactivity between the polyfunctional isocyanate compound and the PVA is to increase the blended amount of the aluminum chelate curing agent in the oil phase. Specifically, the blended amount of the aluminum chelate latent curing agent is preferably set to be the same as, and more preferably 1.0 to 2.0 times, the weight of the polyfunctional isocyanate compound. Consequently, the isocyanate concentration on the surface of the oil phase droplets decreases. Further, since the polyfunctional isocyanate compound has a higher reaction (interfacial polymerization) rate with the amine formed by hydrolysis than a hydroxyl group, the reaction probability of the polyfunctional isocyanate compound and the PVA decreases.

The dissolving or dispersing of the aluminum chelate curing agent, the polyfunctional isocyanate compound, the polyfunctional radical polymerizable compound, the radical polymerization initiator, and the silanol compound of the formula (A) in the organic solvent may be carried out just by mixing and stirring at room temperature under atmospheric pressure. However, optionally, this may also be carried out by heating.

Next, in this production method, the oil phase obtained by dissolving or dispersing the aluminum chelate curing agent, the polyfunctional isocyanate compound, the polyfunctional radical polymerizable compound, the radical polymerization initiator, and the silanol compound of formula (A) in an organic solvent is charged into an aqueous phase including a dispersant. The resultant mixture is then heated and stirred to perform interfacial polymerization and radical polymerization. Examples of dispersants which can be used include dispersants used in ordinary interfacial polymerization, such as polyvinyl alcohol, carboxymethyl cellulose, gelatin and the like. The used amount of the dispersant is generally 0.1 to 10.0 mass % of the aqueous phase.

If the blended amount of the oil phase based on the aqueous phase is too low, the particle size distribution becomes more multi-dispersed state, while if the blended amount is too high, aggregates of fine particles are formed. Therefore, the blended amount of the oil phase is preferably 5 to 70 parts by mass with respect to 100 parts by mass of the aqueous phase.

An example of the emulsifying conditions during the interfacial polymerization is stirring (stirring homogenizer, stirring rate of 6000 rpm or higher) so that the size of the oil phase is preferably 0.5 to 100 μm, and heating and stirring, generally, at atmospheric pressure at 30 to 80° C. for a stirring time of 2 to 12 hours.

The aluminum chelate latent curing agent which can be used in the present invention can be obtained by, after the interfacial polymerization and the radical polymerization are finished, separating the resulting polymer fine particles by filtration, and then drying the separated particles naturally or under a vacuum. This method allows the curing properties of the aluminum chelate latent curing agent to be controlled by changing the type and used amount of the polyfunctional isocyanate compound, the type and used amount of the aluminum chelate curing agent, and the interfacial polymerization conditions. Alternatively, the curing properties can be controlled by changing the type and used amount of the polyfunctional radical polymerizable compound, the radical polymerization initiator, and the silanol compound of the formula (A), and the radical polymerization conditions. For example, lowering the polymerization temperature enables the curing temperature to be decreased. Conversely, increasing the polymerization temperature enables the curing temperature to be increased.

By adding the aluminum chelate latent curing agent according to the present invention to an epoxy resin, a thermosetting epoxy resin composition having low-temperature fast curing properties can be provided. Such a thermosetting epoxy resin composition also forms a part of the present invention.

If the content of the aluminum chelate latent curing agent in the thermosetting epoxy resin composition according to the present invention is too low, curing does not proceed sufficiently, while if the content is too high, the resin properties (for example, flexibility) of the resultant cured product of that composition deteriorate. Therefore, the content is 1 to 70 parts by mass, and preferably 1 to 50 parts by mass, with respect to 100 parts by mass of the epoxy resin.

The epoxy resin constituting the thermosetting epoxy resin composition according to the present invention is used as a film-forming component. Not only can an alicyclic epoxy resin be used as such an epoxy resin, but glycidyl ether epoxy resins, which conventionally could not be used in a mixed system of an aluminum chelate latent curing agent and a silanol compound, can also be used. Such a glycidyl ether epoxy resin may be a liquid or a solid. Preferably, the glycidyl ether epoxy resin usually has an epoxy equivalent of about 100 to 4000, and has 2 or more epoxy groups in the molecule. Examples thereof include a bisphenol A epoxy resin, a phenol novolac epoxy resin, a cresol novolac epoxy resin, an ester epoxy resin and the like. Of these, it is preferred to use a bisphenol A epoxy resin, due to its resin properties. Further, monomers and oligomers of such examples are also included in these epoxy resins.

In addition to such a glycidyl ether epoxy resin, the thermosetting epoxy resin composition according to the present invention can also use an oxetane compound as a resin component to obtain a sharper exothermic peak. Preferred oxetane compound examples include 3-ethyl-3-hydroxymethyloxetane, 1,4-bis{[(3-ethyl-3-oxetanyl)methoxy]methyl}benzene, 4,4'-bis[(3-ethyl-3-oxetanyl)methoxymethyl]biphenyl, bis[(3-ethyl-3-oxetanyl)]methyl 1,4-benzenedicarboxylate, 3-ethyl-3-(phenoxymethyl)oxetane, 3-ethyl-3-(2-ethylhexyloxymethyl)oxetane, di[1-ethyl(3-oxetanyl)]methyl ether, 3-ethyl-3-{[3-(triethoxysilyl)propoxy]methyl}oxetane, oxetanyl silsesquioxane, phenol novolac oxetane and the like. When using an oxetane compound, the amount used is preferably 10 to 100 parts by mass, and more preferably 20 to 70 parts by mass, with respect to 100 parts by mass of the epoxy resin.

The thermosetting epoxy resin composition according to the present invention may optionally further contain a silane coupling agent, a filler such as silica and mica, a pigment, an antistatic agent and the like.

The silane coupling agent, as described in paragraphs 0007 to 0010 of Japanese Patent Application Laid-Open No. 2002-212537, has a function of cooperating with the aluminum chelate curing agent to initiate cationic polymerization of a thermosetting resin (for example, the thermosetting epoxy resin). Therefore, by including a small amount of such a silane coupling agent, the effect of promoting the curing of the epoxy resin can be obtained. The silane coupling agent has 1 to 3 lower alkoxyl groups in the molecule. Further, the silane coupling agent may have a group in the molecule that can react with functional groups on the thermosetting resin, such as a vinyl group, a styryl group, an acryloyloxy group, a methacryloyloxy group, an epoxy group, an amino group, a mercapto group and the like. Further, since the latent curing agent according to the present invention is a cationic curing agent, a silane coupling agent having an amino group or a mercapto group can also be used if the amino group or mercapto group does not substantially capture the generated cation species.

Specific examples of such a silane coupling agent include vinyltris(β-methoxyethoxy)silane, vinyltriethoxysilane, vinyltrimethoxysilane, γ-styryltrimethoxysilane, γ-methacryloxy-propyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

In the case of including a small amount of a silane coupling agent, no effect from adding the silane coupling agent can be expected if the included amount is too small, while if the included amount is too large, the silanolate anions produced from the silane coupling agent can cause a polymerization termination reaction. Therefore, the used amount of the silane coupling agent is 1 to 300 parts by mass, and preferably 1 to 100 parts by mass, with respect to 100 parts by mass of the aluminum chelate latent curing agent.

Since the thus-obtained thermosetting epoxy resin composition according to the present invention can use an aluminum chelate latent curing agent as a curing agent, it has excellent storage stability despite the fact that it is a one-component type. Further, despite the fact that it includes a glycidyl ether epoxy resin, which until now could not be sufficiently cured with an aluminum chelate latent curing agent, the thermosetting epoxy resin composition can be subjected to cationic polymerization by low-temperature fast curing because a silanol compound having high steric hindrance is included in the aluminum chelate latent curing agent without harming the ability of the catalyst to promote cationic polymerization.

EXAMPLES

The present invention will now be described in more detail.

Example 1

Production of Aluminum Chelate Latent Curing Agent

An aqueous phase was prepared by charging 800 parts by mass of distilled water, 0.05 parts by mass of a surfactant (Newrex R-T, NOF Corporation), and 4 parts by mass of polyvinyl alcohol (PVA-205, Kuraray Co., Ltd.) as a dispersant into a 3-L interfacial polymerization vessel equipped with a thermometer, and uniformly mixing the resultant mixture.

This aqueous phase was charged with an oil phase prepared by dissolving the following in 100 parts by mass of ethyl acetate: 100 parts by mass of a solution of aluminum monoacetylacetonate bis(ethylacetoacetate) in isopropanol (Alumichelate D, Kawaken Fine Chemicals Co., Ltd.) with a concentration of 24%, 70 parts by mass of the adduct of trimethylolpropane (1 mole) with methylenediphenyl-4,4'-diisocyanate (3 moles) (D-109, Mitsui Chemicals Polyurethanes, Inc.), 50 parts by mass of triphenylsilanol (TPS, Tokyo Chemical Industry Co., Ltd.), 30 parts by mass of divinylbenzene (Merck & Co., Inc), and 0.3 parts by mass of a radical polymerization initiator (Peroyl L, NOF Corporation). The resultant mixture was emulsified and mixed with a homogenizer (10000 rpm, 5 minutes), and then subjected to interfacial polymerization and radical polymerization for 6 hours at 80° C.

Figure 2A:
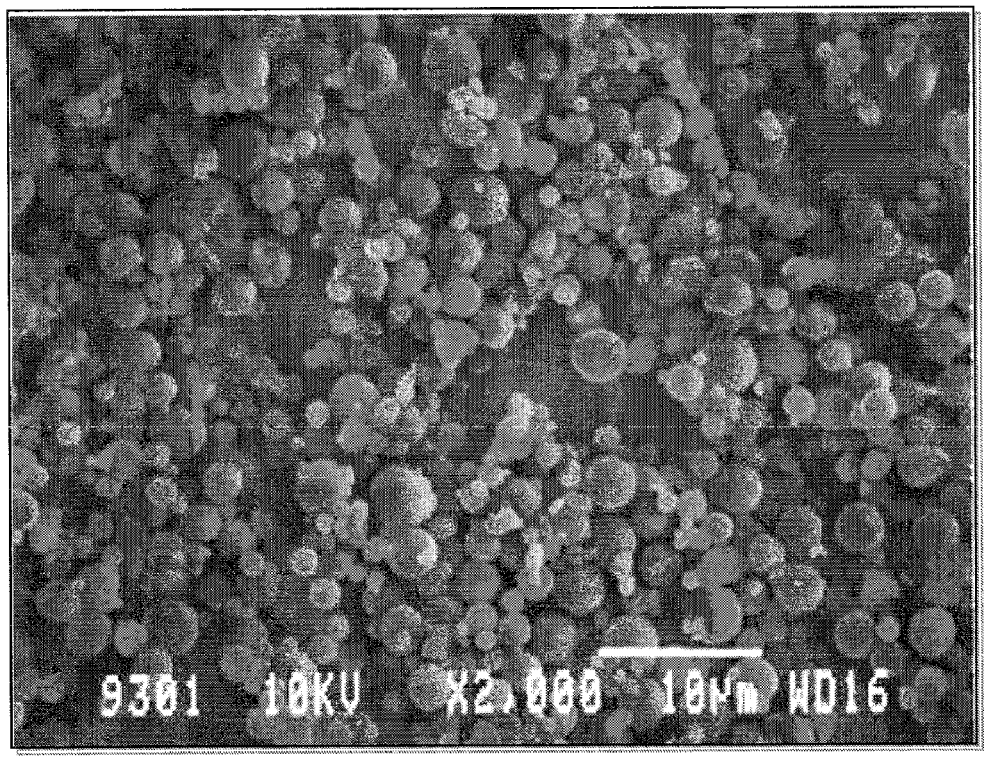
FIG. 2A is an electron micrograph (2000 times magnification) of the aluminum chelate latent curing agent of Example 1.
Figure 2B:
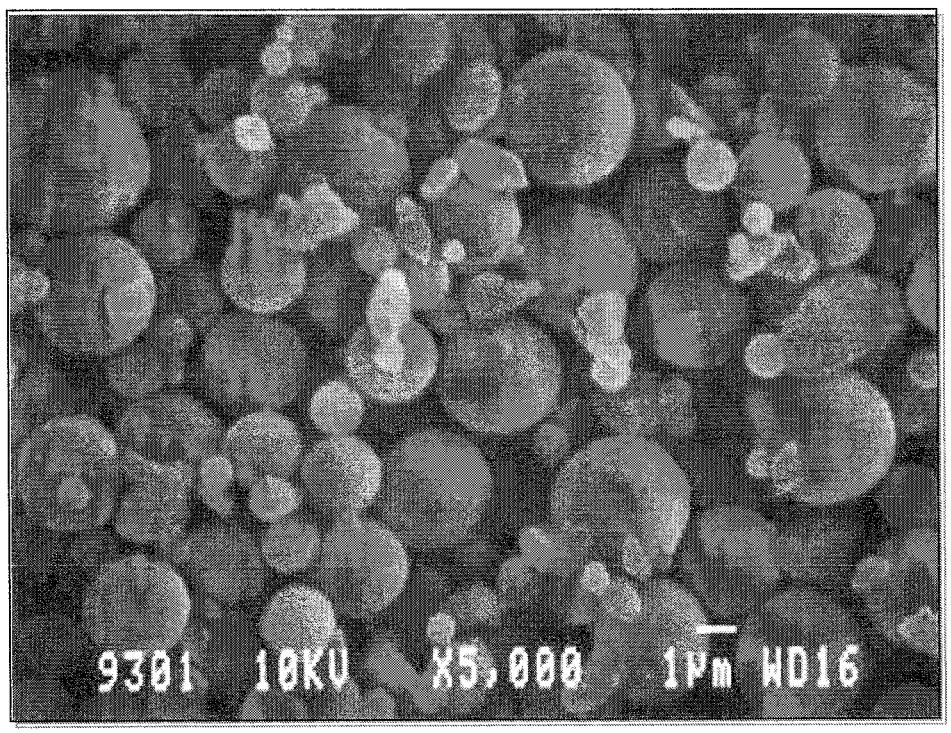
FIG. 2B is an electron micrograph (5000 times magnification) of the aluminum chelate latent curing agent of Example 1.

After the reactions finished, the polymerization reaction solution was left to cool to room temperature. The polymer particles were separated by filtration, and then left to dry naturally to obtain 100 parts by mass of a spherical aluminum chelate latent curing agent. The particle size distribution of the obtained aluminum chelate latent curing agent in terms of volume was measured using a sheath flow electrical resistance particle size distribution measurement apparatus (SD-2000, Sysmex Corporation). The obtained results are shown in FIG. 1. Further, electron micrographs are illustrated in FIG. 2A (2000 times magnification) and FIG. 2B (5000 times magnification). From these results, it can be seen that all of the particles of this aluminum chelate latent curing agent are controlled to a size in the single microns. It can also be seen that the average particle size is 3.14 µm, and the maximum particle size is 8.43 µm.

Example 2

Figure 3:
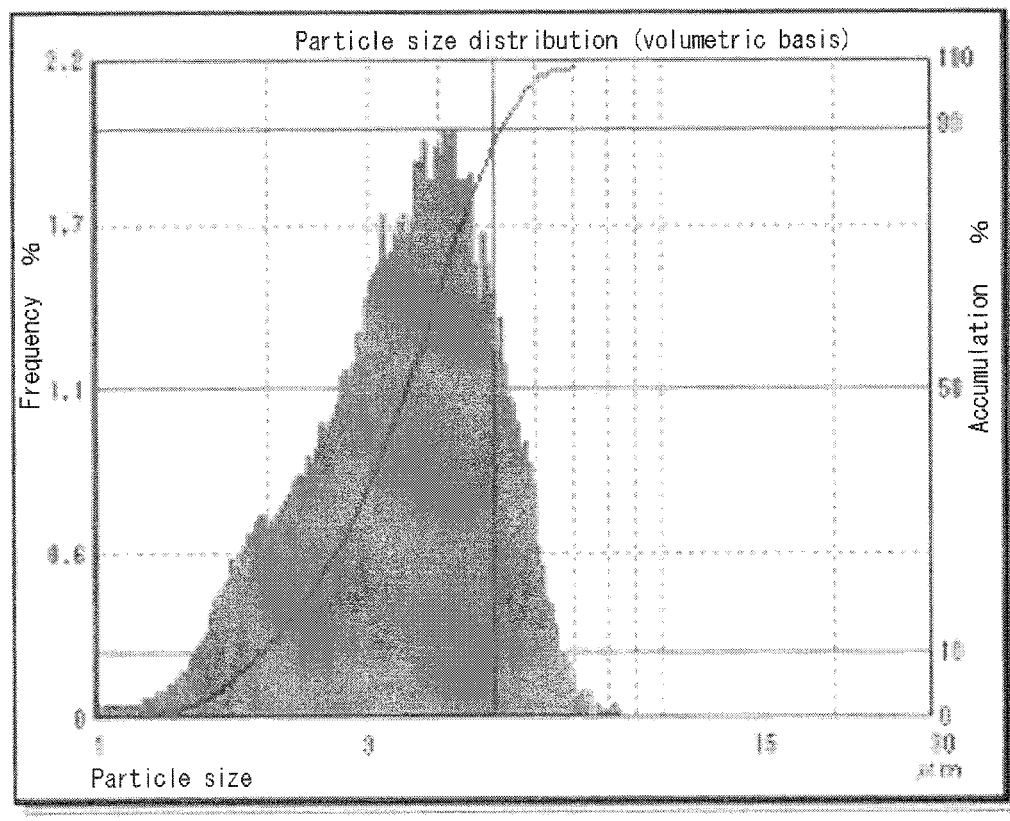
FIG. 3 is a grain size distribution map of the aluminum chelate latent curing agent of Example 2.
Figure 4A:
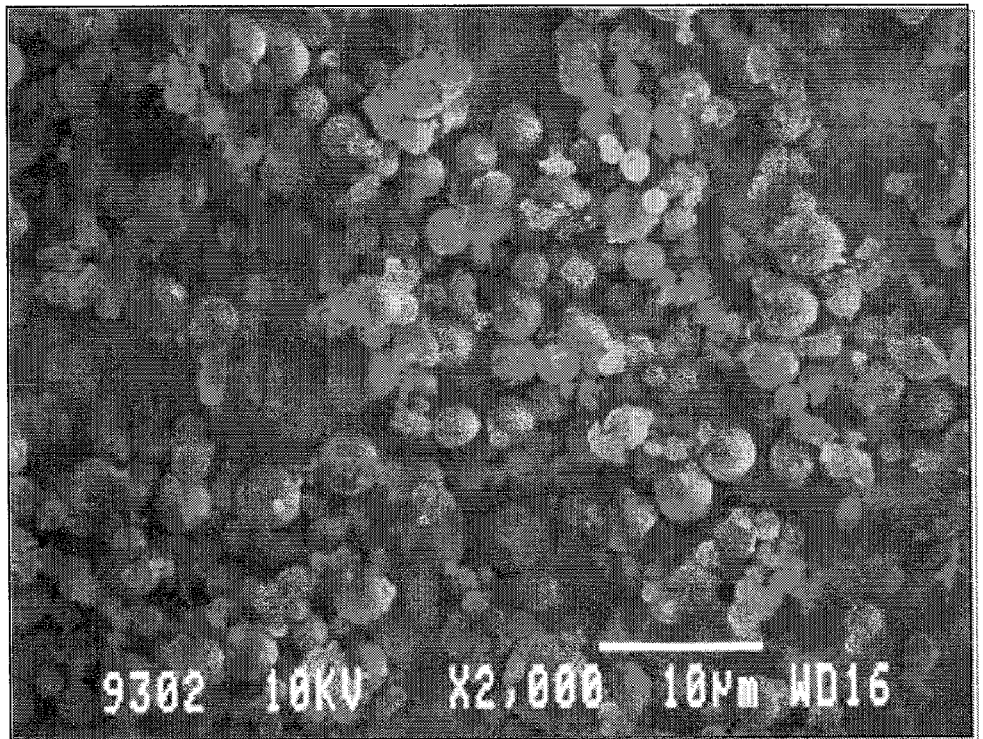
FIG. 4A is an electron micrograph (2000 times magnification) of the aluminum chelate latent curing agent of Example 2.
Figure 4B:
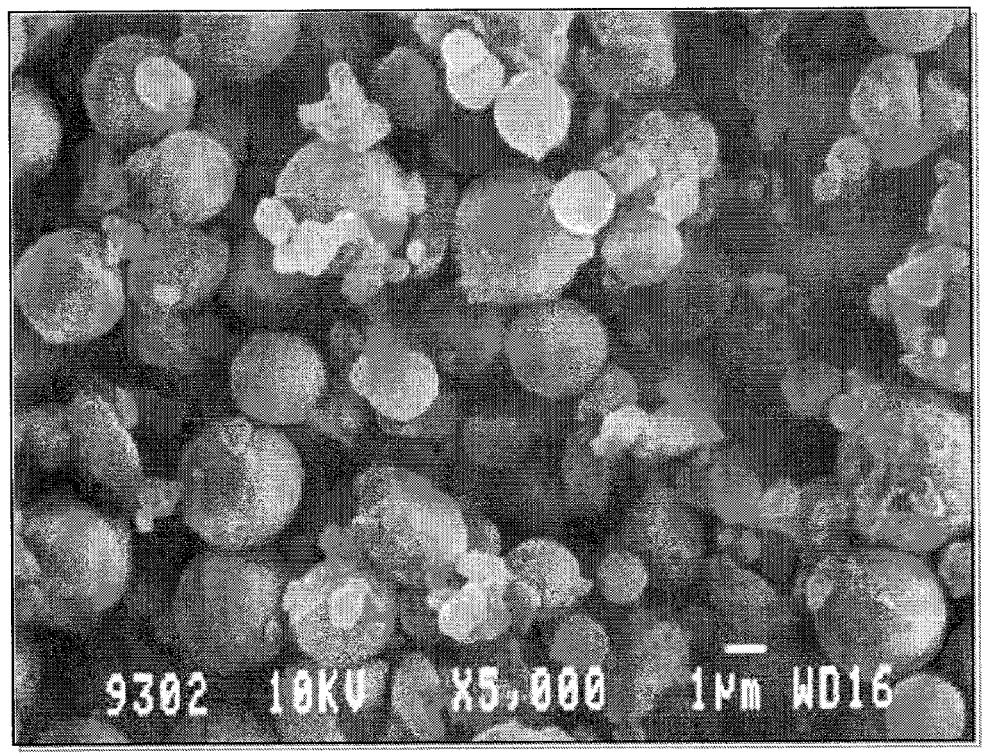
FIG. 4B is an electron micrograph (5000 times magnification) of the aluminum chelate latent curing agent of Example 2.

Production of Aluminum Chelate Latent Curing Agent 150 parts by mass of spherical aluminum chelate latent curing agent was obtained in the same manner as in Example 1, except that the blended amount of triphenylsilanol was increased from 50 parts by mass to 100 parts by mass. The particle size distribution of the obtained aluminum chelate latent curing agent in terms of volume was measured using a sheath flow electric resistance particle size distribution measurement apparatus (SD-2000, Sysmex Corporation). The obtained results are shown in FIG. 3. Further, electron micrographs are illustrated in FIG. 4A (2000 times magnification) and FIG. 4B (5000 times magnification). From these results, it can be seen that all of the particles of this aluminum chelate latent curing agent are controlled to a size in the single microns. It can also be seen that the average particle size is 3.62 µm, and the maximum particle size is 8.72 µm. Further, it can be seen that Example 2, which had a larger amount of silanol compound, had an increased amount of irregularly-shaped particles.

Example 3

Production of Aluminum Chelate Latent Curing Agent 100 parts by mass of spherical aluminum chelate latent curing agent was obtained in the same manner as in Example 1, except that 50 parts by mass of diphenylsilanediol (DPSD) was used instead of triphenylsilanol.

Comparative Example 1

50 parts by mass of spherical aluminum chelate latent curing agent was obtained in the same manner as in Example 1, except that triphenylsilanol was not used at all.

Examples 4 and 5, and Comparative Example 2

Preparation of Thermosetting Epoxy Resin Composition

A thermosetting epoxy resin composition was prepared by uniformly mixing 20 parts by mass of the aluminum chelate latent curing agent of Example 1, 2, or Comparative Example 1 and 80 parts by mass of a bisphenol A epoxy resin (EP828, Japan Epoxy Resin Co., Ltd.).

The obtained thermosetting epoxy resin composition was subjected to thermal analysis using a differential thermal analyzer (DSC) (DSC 6200, Seiko Instruments Inc.) The obtained results are shown in Table 1 and FIG. 5. Here, concerning the curing properties of the aluminum chelate latent curing agent, "exothermic onset temperature" refers to the temperature at which curing starts; "exothermic peak temperature" refers to the temperature at which curing is most active; "exothermic end temperature" refers to the temperature at which curing ends; and "peak surface area" refers to the heating value. To realize good low-temperature fast curing properties, it is preferred that the actual gross heating value is 250 J/g or more.

|  | TPS Blended Amount (parts by mass) | Exothermic Onset Temperature (° C.) | Exothermic Peak Temperature (° C.) | Gross Heating Value (J/g) |
| --- | --- | --- | --- | --- |
| Comparative Example 2 | 0 Curing agent of Comparative Example 1 | — | — | — |
| Example 4 | 50 Curing agent of Example 1 | 76.2 | 108.5 | 351 |
| Example 5 | 100 Curing agent of Example 2 | 50.4 | 100.2 | 394 |

Figure 5:
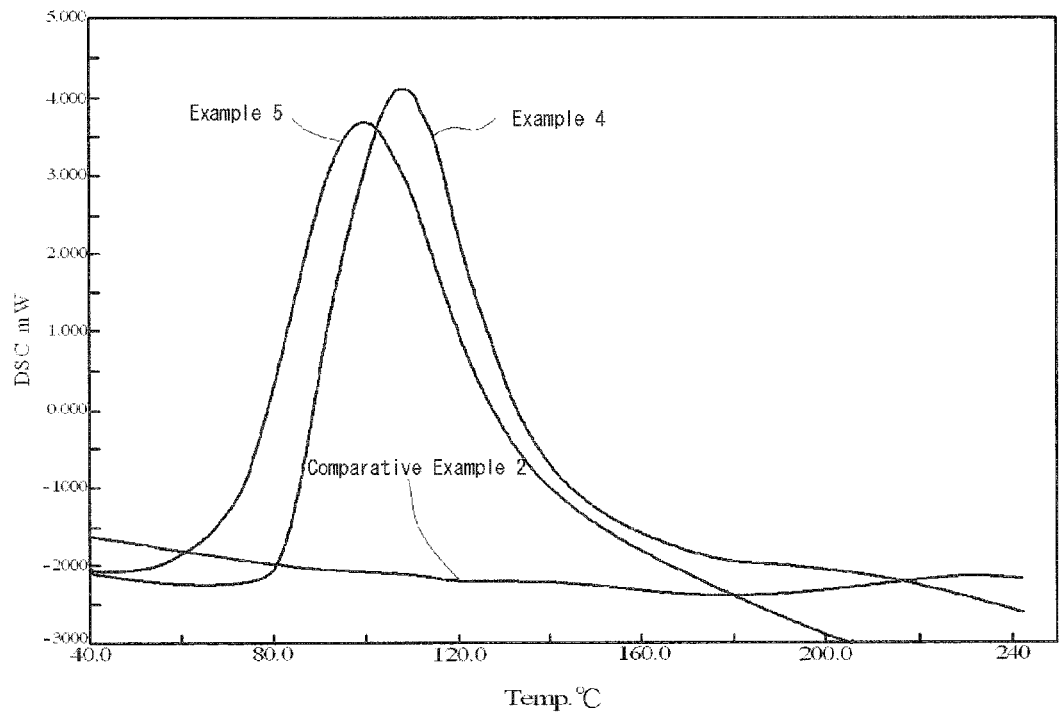
FIG. 5 is a DSC measurement diagram of the thermosetting epoxy resin compositions of Example 4, Example 5, and Comparative Example 2.

It is clear from Table 1 and FIG. 5 that, for the thermosetting epoxy resin composition of Comparative Example 2, in which the aluminum chelate latent curing agent of Comparative Example 1 that did not hold a silanol compound was used alone, the epoxy resin could not be cured. In contrast, for the thermosetting epoxy resin compositions of Examples 4 and 5, in which an aluminum chelate latent curing agent that did hold a silanol compound was used, latency and low-temperature fast curing properties were achieved.

Further, it can also be seen from the results of Examples 4 and 5 that the curing properties of a thermosetting epoxy resin composition can be controlled by adjusting the amount of TPS held in the aluminum chelate latent curing agent.

Examples 6 to 8

Thermosetting epoxy resin compositions were prepared by mixing the aluminum chelate latent curing agent of Example 1 and a bisphenol A epoxy resin (EP828, Japan Epoxy Resin Co., Ltd.) in the blending ratios shown in Table 2.

The obtained thermosetting epoxy resin compositions were subjected to thermal analysis using a differential thermal analyzer (DSC) (DSC 6200, Seiko Instruments Inc.) The obtained results are shown in Table 2 and FIG. 6. For reference, the results of Example 4 are also shown.

TABLE 2

|  | EP828 Blended Amount (parts by mass) | Curing Agent Blended Amount (parts by mass) | Exothermic Onset Temperature (° C.) | Exothermic Peak Temperature (° C.) | Gross Heating Value (J/g) |
| --- | --- | --- | --- | --- | --- |
| Example 6 | 95 | 5 | 70.7 | 106.3 | 254 |
| Example 4 | 80 | 20 | 76.2 | 108.5 | 351 |
| Example 7 | 70 | 30 | 58.0 | 110.3 | 348 |
| Example 8 | 50 | 50 | 56.6 | 112.9 | 299 |

Figure 6:
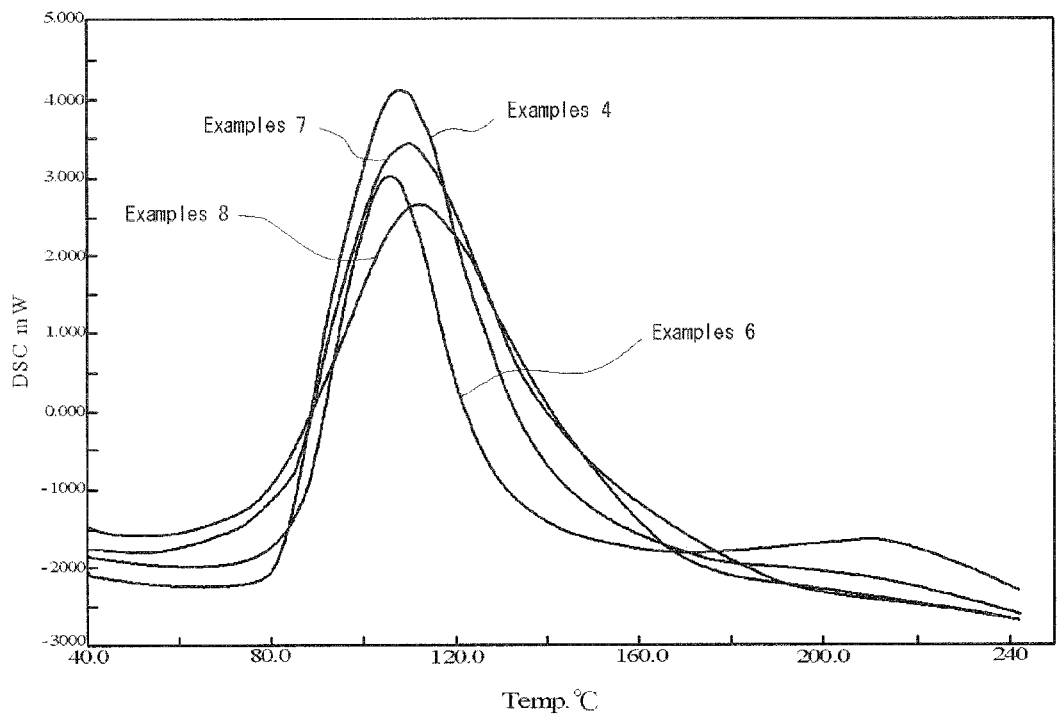
FIG. 6 is a DSC measurement diagram of the thermosetting epoxy resin compositions of Example 4 and Examples 6 to 8.

From Table 2 and FIG. 6, it can be seen that if the blended ratio of the aluminum chelate latent curing agent is increased, the exothermic onset temperature of the thermosetting epoxy resin composition shifts toward the low temperature side and the curve broadens. For Example 6, in which the blending ratio was the lowest, a shoulder produced in the high temperature region could be observed. Therefore, to ensure an actual gross heating value of 250 J/g or more in order to realize good low-temperature fast curing properties, it is preferred that the blended amount of the aluminum chelate latent curing agent is 5 to 50 mass % of the thermosetting epoxy resin composition.

Example 9

A thermosetting epoxy resin composition was prepared in the same manner as in Example 4, except that the aluminum chelate latent curing agent of Example 3 using diphenylsilanediol instead of triphenylsilanol was used. The obtained thermosetting epoxy resin composition was subjected to thermal analysis using a differential thermal analyzer (DSC) (DSC 6200, Seiko Instruments Inc.) The obtained results are shown in Table 3 and FIG. 7, For reference, the results of Example 4 are also shown.

|  | Silanol Compound | Exothermic Onset Temperature (° C.) | Exothermic Peak Temperature (° C.) | Gross Heating Value (J/g) |
| --- | --- | --- | --- | --- |
| Example 4 | TPS | 76.2 | 108.5 | 351 |
| Example 9 | DPSD | 55.6 | 98.5 (210.3)*1 | 253 |

*Double Peak

Figure 7:
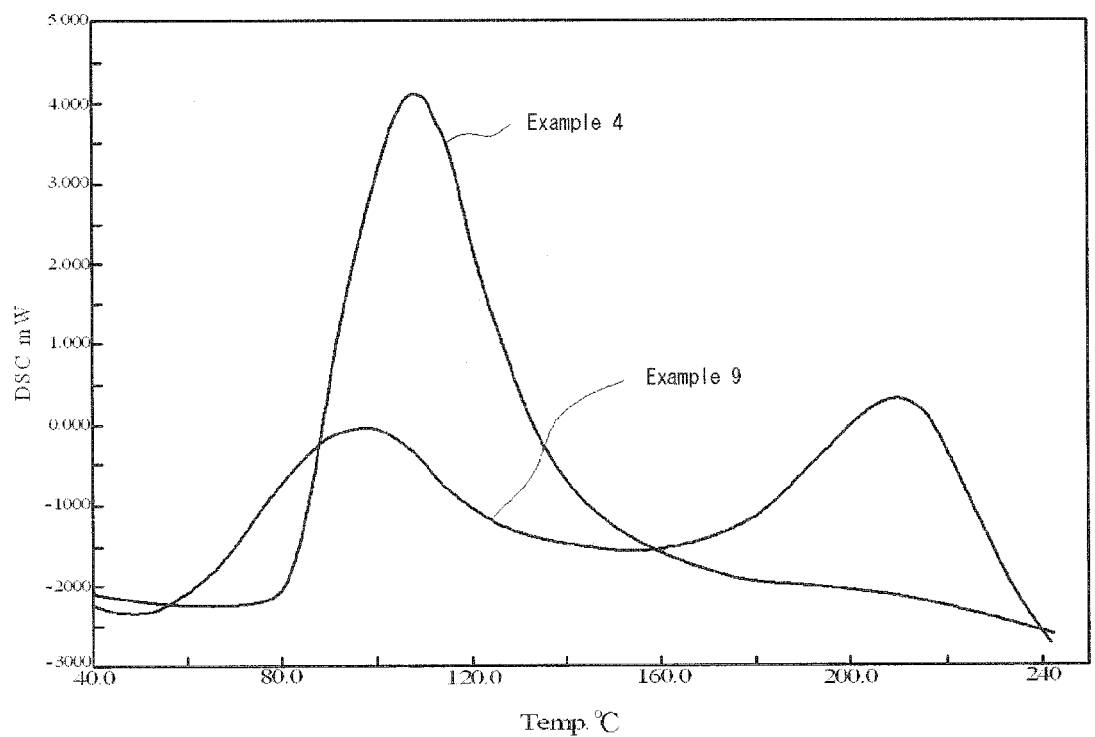
FIG. 7 is a DSC measurement diagram of the thermosetting epoxy resin compositions of Example 4 and Example 9.

From the results of Table 3 and FIG. 7, it can be seen that when triphenylsilanol, in which m in the formula (A) is 3, and diphenylsilanediol, in which m is 2, were used as the silanol compound, all of the epoxy resins could be cured. However, silanol compounds in which m is 3 can be seen to have superior low temperature fast curing properties.

Examples 10 to 12

Thermosetting epoxy resin compositions were prepared in the same manner as in Example 4, except that a part of the bisphenol A epoxy resin (EP828) in the thermosetting epoxy resin composition of Example 4 was changed to an oxetane compound (di[1-ethyl(3-oxetanyl)]methyl ether: OXT-221, Toagosei Co., Ltd.), as illustrated in Table 4. The obtained thermosetting epoxy resin compositions were subjected to thermal analysis using a differential thermal analyzer (DSC) (DSC 6200, Seiko Instruments Inc.) The obtained results are shown in Table 4 and FIG. 8. For reference, the results of Example 4 are also shown.

TABLE 4

|  | EP828 (parts by mass) | OXT-221 | Exothermic Onset Temperature (° C.) | Exothermic Peak Temperature (° C.) | Gross Heating Value (J/g) |
| --- | --- | --- | --- | --- | --- |
| Example 4 | 80 | 0 | 76.2 | 108.5 | 351 |
| Example 10 | 70 | 10 | 55.0 | 87.4 | 321 |
| Example 11 | 60 | 20 | 60.3 | 85.1 | 373 |
| Example 12 | 50 | 30 | 56.0 | 85.1 | 446 |

Figure 8:
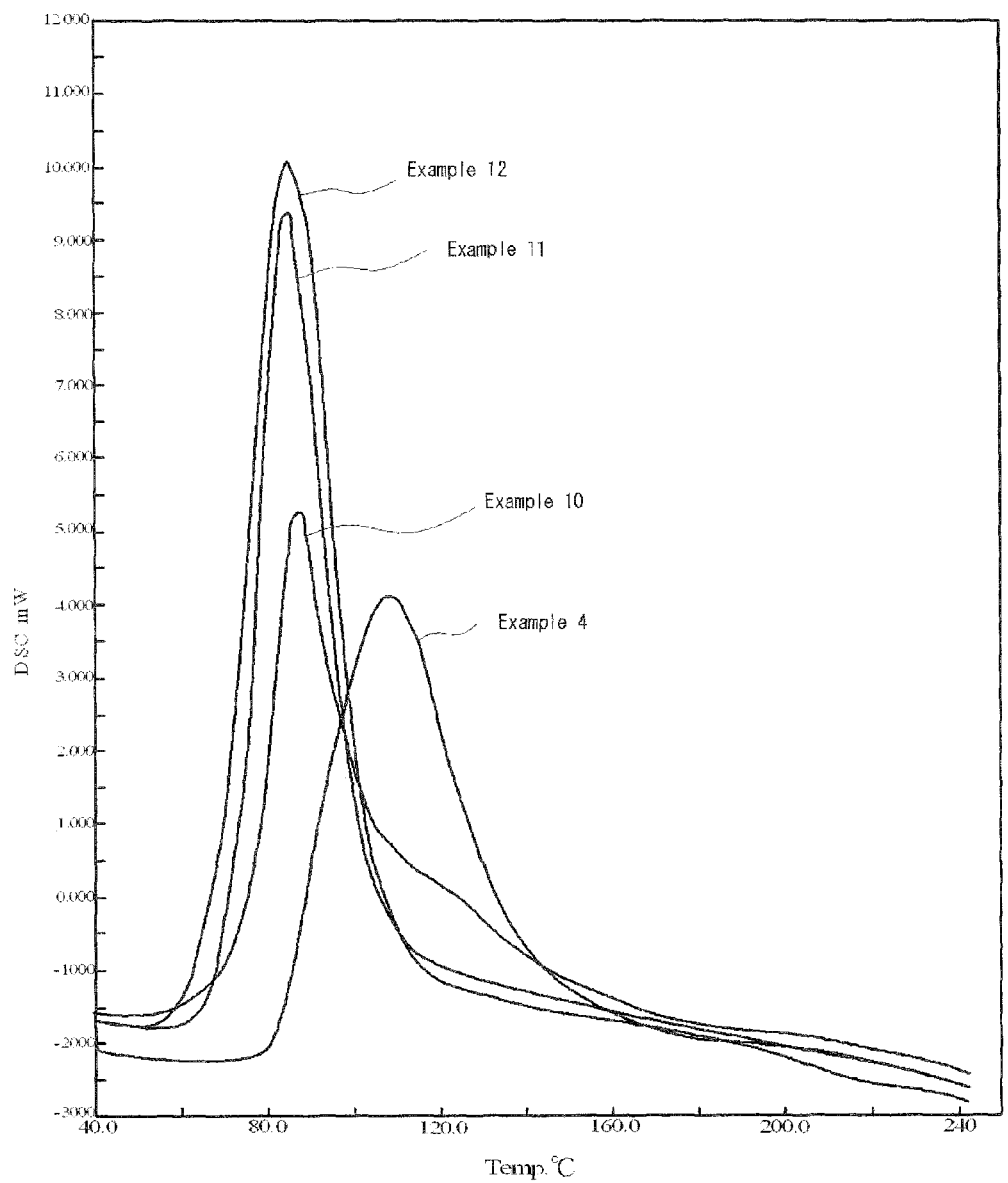
FIG. 8 is a DSC measurement diagram of the thermosetting epoxy resin compositions of Example 4 and Examples 10 to 12.

From the results of Table 4 and FIG. 8, it can be seen that if an oxetane compound is used at the same time, the exothermic onset temperature and the exothermic peak temperature tend to shift toward the low temperature side. Therefore, it can be seen that by using an oxetane compound at the same time, the low-temperature fast curing properties of the thermosetting epoxy resin composition can be improved. Further, it can be seen that if 30 parts by mass of an oxetane compound as the resin component is added, the gross heating value exceeds 400 J/g, and a high reactivity is exhibited.

INDUSTRIAL APPLICABILITY

The aluminum chelate latent curing agent according to the present invention can cure an epoxy resin which includes an inexpensive and multipurpose glycidyl ether epoxy resin at a low temperature and quickly. Therefore, the present aluminum chelate latent curing agent is useful as a latent curing agent in an epoxy adhesive for low-temperature quick bonding.

The invention claimed is:

1. An aluminum chelate latent curing agent, comprising an aluminum chelate curing agent, and a porous resin that holds the aluminum chelate curing agent and is obtained by subjecting a polyfunctional isocyanate compound to interfacial polymerization while simultaneously subjecting a polyfunctional radical polymerizable compound to radical polymerization in the presence of a radical polymerization initiator, wherein a silanol compound of the formula (A) is further held in the porous resin,

$$(Ar)_m Si(OH)_n \quad (A)$$

where, in the formula, m is 2 or 3; the sum of m and n is 4; Ar represents an optionally-substituted aryl group.

2. The aluminum chelate latent curing agent according to claim 1, wherein Ar represents an optionally-substituted phenyl group.

3. The aluminum chelate latent curing agent according to claim 1, wherein the silanol compound is triphenylsilanol or diphenylsilanediol.

4. The aluminum chelate latent curing agent according to claim 1, wherein the polyfunctional radical polymerizable compound is divinyl benzene.

5. A method for producing the aluminum chelate latent curing agent as set forth in claim 1, comprising:
charging an oil phase obtained by dissolving or dispersing an aluminum chelate curing agent, a polyfunctional isocyanate compound, a polyfunctional radical polymerizable compound, a radical polymerization initiator, and a silanol compound of the formula (A) in an organic solvent into an aqueous phase including a dispersant while heating and stirring to cause the polyfunctional isocyanate compound to undergo interfacial polymerization while the polyfunctional radical polymerizable compound simultaneously undergoes radical polymerization, so that the aluminum chelate curing agent and the silanol compound of the formula (A) are held in the resultant porous resin,

$$(Ar)_m Si(OH)_n \quad (A)$$

where, in the formula, m is 2 or 3; the sum of m and n is 4; Ar represents an optionally-substituted aryl group.

6. A thermosetting epoxy resin composition comprising: the aluminum chelate latent curing agent as set forth in claim 1; and an epoxy resin.

7. The thermosetting epoxy resin composition according to claim 6, wherein the epoxy resin is a glycidyl ether epoxy resin.

8. The thermosetting epoxy resin composition according claim 6, further comprising an oxetane compound.

* * * * *